United States Patent [19]

Coombs

[11] 3,894,985

[45] July 15, 1975

[54] NON-COLORING DIATOMITE-FILLED POLYOLEFINS

[75] Inventor: Garth Coombs, Evergreen, Colo.

[73] Assignee: Johns-Manville Corporation, Denver, Colo.

[22] Filed: Feb. 14, 1974

[21] Appl. No.: 442,513

[52] U.S. Cl............................ 260/42.14; 260/42.46
[51] Int. Cl. ............................................ C08f 45/04
[58] Field of Search........................ 260/42.14, 42.46

[56]  References Cited
UNITED STATES PATENTS

| | | | |
|---|---|---|---|
| 2,701,240 | 2/1955 | Bregar | 423/335 |
| 2,956,035 | 10/1960 | Mock | 260/23 |
| 3,028,355 | 4/1962 | Troy et al. | 260/42.46 |
| 3,293,206 | 12/1966 | Horne | 260/42.45 |

FOREIGN PATENTS OR APPLICATIONS 1,219,783   1/1971   United Kingdom

Primary Examiner—James H. Derrington
Attorney, Agent, or Firm—Robert H. Krone; James W. McClain, Jr.

[57]  ABSTRACT

Transparent polyolefin films containing diatomite as an anti-blocking agent have in the past had a tendency to become discolored after an interval of time. That tendency is completely overcome by incorporation into the polyolefin of white diatomite having a pH not above 7.5, and preferably in the range of 5.5 to 7.5. Such diatomite can be obtained by chemical calcining of gray, tan or white diatomite with strong inorganic acids.

9 Claims, No Drawings

NON-COLORING DIATOMITE-FILLED POLYOLEFINS

BACKGROUND OF THE INVENTION

1. Field of the Invention

The invention herein relates to a diatomite filler for polyolefin plastic films. More particularly, it relates to a diatomite anti-blocking filler for polyethylene and/or polypropylene films which avoids the yellowing problems heretofore encountered in numerous instances.

2. Description of the Prior Art

Thin polyolefin films, such as those of polypropylene, polyethylene, and copolymers or mixtures thereof, have been widely used in recent years, particularly for packaging purposes, because of their advantageous properties including inertness to chemicals, mechanical strength, low moisture vapor permeability and transparency. Such thin films, however, particularly those of polyethylene, have a decided tendency to stick tightly together, a property known as "blocking." Blocking of films seriously impairs the handleability of films, bags and similar materials made from the films. The phenomenon of blocking is described in detail in U.S. Pat. Nos. 2,938,879; 2,956,035; 3,028,355; and 3,293,206 and in an article by Horne et al, "Blocking of PE Films," SPE Journal, 25, 34–38 (November 1969).

Some time ago it was discovered that very finely divided diatomite, i.e., that having an average particle size between about 0.5 and 7 microns, usually about 2 to 6 microns, could be incorporated into a polyethylene film in small amounts to act as an anti-blocking agent. The concentration of diatomite is usually in the range of about 2 to 4 parts by weight per 1,000 parts of polyolefin. The general concept of diatomite incorporation is described in the aforecited U.S. Pat. Nos. 2,956,035 and 3,028,355, while the incorporation of diatomite which has been alkali treated such as with ammonia or a soluble alkali or alkaline earth hydroxide, carbonate, phosphate, or similar salt is described in aforecited U.S. Pat. No. 3,293,206. The actual mechanism by which diatomite prevents blocking is not known, but it is believed that portions of the diatomite particles protrude through the surface of the polyolefin sheet and physically inhibit the cohesion of the adjacent sheets.

The widespread use of diatomite as an anti-blocking agent in polyolefin films has, however, been complicated by the tendency of the diatomite to cause such films to become colored by a tint ranging from light yellow to light brown or to aggravate the tendency for other film additives to cause such coloration. This, of course, is extremely detrimental for films which are intended to be clear and transparent. The coloring renders the films entirely unsuitable for uses such as food packaging. The problem is particularly baffling because the coloration does not appear immediately upon incorporation of the diatomite and formation of the film. Rather, the color appears gradually over a period of several weeks or months, often after the film has already been used in some form of packaging. The long delay between diatomite incorporation and color formation thus prevents the polyolefin film manufacturer from preventing the problem by screening of polyolefin and/or diatomite samples prior to or immediately after film manufacture. In addition, not all samples of polyolefin film which contain diatomite discolor. While the coloration problem has been directly linked to the use of diatomite as a filler, film manufacturers are reluctant to remove diatomite from the film formation because of its acknowledged superiority as an anti-blocking agent. They are also reluctant to incorporate exotic additives into the film to inhibit color formation, since many such additives themselves have a detrimental effect on the film, particularly on its transparency, and in any event such additives are usually very costly.

The coloration of polyolefins is particularly apparent in connection with the typical industrial practice of "master-batching." In this practice, the virgin polyolefin (e.g., polyethylene) is compounded with the diatomite anti-blocking agent, anti-oxidants and/or lubricants and other additives at relatively high additive concentrations. This concentrated material is then pelleted for subsequent blending with virgin polyolefin to make individual batches with the desired lower additive concentration for film formation. It is common to store the concentrated "master batches" for varying periods of time prior to blending for film formation. Since the additive concentration is high, the coloration phenomenon often becomes evident during storage. The coloration is accentuated by comparison with the white virgin polyolefin at the time of blending.

Consequently, it would be of great value to provide a material which has both superior anti-blocking properties and does not cause coloration of the polyolefin or promote coloration due to other additives.

BRIEF SUMMARY OF THE INVENTION

The invention herein resides in the discovery that incorporation into polyolefin, particularly polyethylene batches and/or films, of diatomite having a pH not greater than 7.5, and preferably in the range of 5.5 to 7.5 provides the advantageous and superior anti-blocking characteristics for films previously associated with diatomite while entirely overcoming the problem of coloration, for it has been unexpectedly discovered that diatomite having a pH in this range has no tendency to promote coloration of the polyolefin batch and/or film and does not promote coloration due to other additives. The invention also encompasses a polyolefin film, particularly a polyethylene film, having incorporated therein as an anti-blocking agent diatomite having a pH not greater than 7.5, and preferably in the range of 5.5 to 7.5.

DETAILED DESCRIPTION AND PREFERRED EMBODIMENTS

Diatomite intended for use in transparent polyolefin thin films must meet a number of very stringent requirements. Because of the transparency and clarity of the film, the diatomite must have a pure white color so that the clear film will not give the appearance of having a tint or haze because of the color of the diatomite. While some diatomites are naturally white, others have gray or tan colors. Heretofore it has been customary in commercial practice to "chemically calcine" crude or powdered diatomite with such materials as soda ash (commercial anhydrous sodium carbonate) to convert that diatomite which is normally gray or tan to the desired white. The resultant white commercial diatomite normally has a pH in the range equivalent to that of naturally white diatomite, i.e., of from about 8.5 upward to as high as 10.5 or greater. It is this material, comminuted to the above-mentioned 0.5 to 7 micron size, which has attained widespread use as a highly successful anti-blocking agent for the polyolefin film. It is also this material to which is attributable the adverse coloration effects.

The invention herein resides in the discovery that if there is incorporated into the polyolefin a white diatomite having a pH not greater than 7.5, preferably in the range of 5.5 to 7.5, and more preferably 6.0 to 7.5, rather than the higher pH white diatomite of commerce, the superior film antiblocking properties of diatomite fillers are retained while the tendency of the diatomite filler to cause coloration of film is wholly eliminated. (As used herein, "low pH" generally refers to pH's of 7.5 or less, e.g., those of the white diatomites of this invention, while "high pH" generally refers to the pH's which are in the range of about 8 or 9 and higher, e.g., those of many of the prior art diatomites described.)

White diatomite of appropriate pH may be obtained in several ways. A preferred method is to produce low pH white diatomite by chemically calcining tan or gray natural diatomite with a strong acid, particularly a strong inorganic acid. Suitable acids include sulfuric, hydrochloric, nitric and phosphoric. Of these phosphoric acid has been found to be particularly useful. A satisfactory procedure for chemically calcining gray or tan diatomite with phosphoric acid is described in U.S. Pat. No. 2,701,240. Chemical calcination of the gray or tan diatomite to produce low pH white diatomite appears to require a strongly acidic medium. Acid salts of strong acids may produce acceptably low pH white diatomite but neutral salts of strong acids or acid salts of weak acids will generally be ineffective. It should be understood, however, that the invention herein is concerned with the incorporation of the low pH white diatomite into the polyolefin and that the particular method by which one obtains the low pH of the white diatomite is not critical. Consequently, use of acid salts, strong acids and other media to obtain low pH white diatomite are all considered to be within the scope of the present invention.

Low pH white diatomite may also be produced by chemically calcining high pH naturally white diatomite with strong acids. The techniques used are the same as those described above.

Very low pH's (i.e., those below 5.5) can be obtained with the techniques described. However, higher concentrations of acid are usually required and the resultant cost is higher. Since the less acidic diatomite is entirely satisfactory for overcoming the coloration problem, economic considerations favor the preferred pH ranges set forth above.

A wide variety of diatomites may be treated to obtain the low pH and white coloration required. These include low pH gray or tan diatomites which must be decolorized while maintaining the low pH, and white diatomites with high pH's which must be reduced in pH while maintaining the white coloration. Success has been achieved in treating with phosphoric acid both gray diatomites having pH's around 7.0 and white diatomites having pH's of around 9.5. Treatment of both has resulted in the production of white diatomites having pH's in the 5.5 to 7.5 range described. It will be understood that the use of low pH white diatomite as a filler in the polyolefin film calls for the use of a relatively "clean" grade of diatomite. This is because other materials which may be present in the films can also cause discoloration. Normally, use of, for instance, a phosphoric acid chemically calcined white diatomite having a low pH will prevent the diatomite from causing coloration of the film. However, if the diatomite contains large amounts of impurities, particularly certain multi-valent metal ions such as iron and manganese, those impurities will themselves cause coloration, unless they are chemically inactivated by the acidic calcination. Determination of the type and concentration of impurities which may be present in the low pH white diatomite is well within the ability of those skilled in the art. Numerous grades of commercial diatomites, such as a number of those available under the trademark CELITE from Johns-Manville Corporation, are quite suitable for decoloration and/or pH reduction to yield satisfactory low pH white diatomites.

The diatomite product will also need to meet the size criterion described above. Particle size must be in the range of 0.5 to 7 microns, and preferably in the range of 2 to 6 microns. Particle sizes larger than these have been found to be unacceptable in the transparent polyolefin films, for the larger particles are visible to the naked eye and thus impart to the transparent film a translucent or clouded appearance. Smaller sizes, on the other hand, are not large enough to be effective anti-blocking agents. The proper particle size may be obtained by comminution and size classification prior to any treatment such as phosphoric acid calcination, or a previously treated material may be comminuted and classified following the treatment. Comminution and classification are generally preferred prior to any acid calcination, however, for the effectiveness of such acid calcination is improved where the diatomite particles to be treated are quite small, i.e., having a large surface to volume ratio.

The diatomite particles will be incorporated into the polyolefin film in an amount of from about 2 to 4 parts by weight per 1,000 parts of resin (0.2 to 0.4 phr). In concentrations less than this, the diatomite loses some effectiveness as an anti-blocking agent, while in greater concentrations the amount of diatomite is such as to approach or exceed the limit of visibility and thus to impart a translucent or cloudy appearance to the film. In addition, amounts greater than 0.4 phr do not significantly increase the adequate anti-blocking properties obtained by concentrations of 0.2 to 0.4 phr.

The examples in the Tables below will illustrate the present invention. In Table 1 four groups of diatomites are shown used as fillers in polyethylene films, and are compared to control samples of unfilled polyethylene films. The polyethylene resin in each case (except "Control A" which was virgin polyethylene) was a specially compounded polyethylene mixture containing all ordinary commercial additives except an antiblock agent. The material was a low-density two-melt polyethylene having a specific gravity of 0.917 and containing di-tert.-butyl-p-cresol (DBPC; also known as BHT or butylated hydroxy toluene). For each test sample a 40-gram batch of the polyethylene mixture was filled with 1 percent of the test diatomite and mixed for ten minutes in a Brabender mixer at 60 rpm and 120°C jacket temperature. Following mixing the filled material, while still hot, was pressed into duplicate ⅛-inch-thick pieces in a hand press. These pieces were stored in labeled closed glass jars at 50°C for a number of weeks, and all were observed weekly for color change. The duplicate samples of each test diatomite and control material which were prepared are designated as samples 1 and 2 for each test material in Table 1 below.

The results of the coloration test are shown below in Table 1, and a description of each test material is provided in Table 2.

TABLE 1

| Filler | pH | Sample | Weeks in Oven | | | | | |
|---|---|---|---|---|---|---|---|---|
| | | | 4 | 6 | 7 | 8 | 11 | 25 |
| Controls | | | | | | | | |
| A | — | 1 | W | W | W | W | W | W |
| | — | 2 | W | W | W | W | W | W |
| B | — | 1 | W | W | W | W | LY | LY |
| | — | 2 | W | W | W | W | W | W |
| Group I Diatomite | | | | | | | | |
| A | 9.8 | 1 | W | LY | LY | LY | Y | — |
| | | 2 | W | LY | Y | Y | Y | — |
| B | 9.6 | 1 | W | LY | LY | LY | Y | — |
| | | 2 | W | LY | LY | LY | Y | — |
| C | 9.6 | 1 | W | LY | Y | Y | Y | — |
| | | 2 | W | W | W | W | W | Y |
| D | 9.2 | 1 | W | LY | Y | Y | Y | — |
| | | 2 | W | W | LY | LB | LB | — |
| E | 10.5 | 1 | W | W | W | LY | Y | — |
| | | 2 | W | Y | Y | Y | Y | — |
| F | 9 | 1 | W | W | W | W | W | LY |
| | | 2 | LY | LY | LY | LB | LB | LB |
| Group II Diatomite | | | | | | | | |
| G | 5.9 | 1 | W | W | W | W | W | W |
| | 7.0 | 2 | W | W | W | W | W | W |
| H | 6.5 | 1 | W | W | W | W | W | W |
| | | 2 | W | W | W | W | W | W |
| Group III Diatomite | | | | | | | | |
| I | 9.2 | 1 | W | W | LY | LY | Y | — |
| | | 2 | W | W | LY | LB | LB | — |
| J | 9.7 | 1 | W | Y | Y | Y | Y | — |
| | | 2 | W | W | W | W | LY | — |
| Group IV Diatomite | | | | | | | | |
| K | 9 | 1 | W | W | W | W | W | W |
| | | 2 | W | W | W | W | W | LB |

Color code:
W — White
LY — Light Yellow
Y — Yellow
LB — Light Brown

TABLE 2

Description of Test Materials

| Controls: | A — virgin polyethylene |
| | B — chemically stabilized polyethylene |
| Group I: | soda-ash calcined commercial diatomites |
| Group II: | commercial diatomites chemically calcined with 10% phosphoric acid |
| Group III: | commercial diatomites calcined with 8% tetrasodium pyrophosphate |
| Group IV: | a natural white diatomite |

From these data the unexpected superiority of the present invention is clearly evident. Controls A and B clearly show that coloration is a function of the anti-blocking diatomite. It will be noted that the virgin polyethylene does not color over the 25-week period. There is a tendency for some coloration to occur in the chemically stabilized polyethylene, but it is quite slow in occurring. The data of the Group I series, which encompasses a wide variety of commercial diatomites, flux calcined by a conventional technique using soda-ash, clearly shows that coloration is a common occurrence with all high pH diatomites regardless of the particular type used. It will be observed that certain samples, particularly those designated C and F, showed a wide variation in the degree and rapidity of coloration between the two duplicate samples, but all ultimately became colored to some degree. This is entirely consistent with the coloration effect as observed in present commercial practice. In some cases a particular diatomite anti-blocking agent will produce a film which is entirely free of coloration for a long period, while a second film containing another portion of exactly the same diatomite will rapidly become badly discolored. In other words, one of the major elements of the coloration problem is its lack of uniformity and predictability. Consequently, the Group I series of experiments exemplifies the coloration problem as it existed in the prior art immediately preceding this invention.

The Group II series exemplifies the present invention. Samples of commercial diatomite were chemically calcined with 10 percent phosphoric acid to produce white diatomite having pH's as shown. All duplicate samples prepared with these diatomites as anti-blocking agents showed no change in coloration as compared to the control samples over the entire 25-week period of the test. It can thus be seen that the low-pH white diatomites do not themselves cause coloration. In fact, as compared with Control B, it can even be surmised that the low-pH white diatomites have an inhibiting effect on the tendency of the other additives to cause coloration.

The Groups III and IV series illustrate that coloration is a function of pH of the white diatomite. In Group III similar samples of commercial diatomite were flux calcined with 8 percent of a slightly basic salt of phosphoric acid. The resulting pH of the diatomite was high, and once again coloration occurred to some degree in at least one duplicate of all samples, clearly indicating that this type of treatment is ineffective in overcoming the prior art problem. The Group IV runs were made with a naturally white diatomite. It will be immediately evident that the natural material also caused coloration, although onset of coloration was slower than with the flux calcined materials.

The polyolefin materials which are useful as film formers in this invention include polyethylene, polypropylene and mixtures thereof such as the various ethylene-propylene ("E-P") copolymers. Since the problem of discoloration has been found to be more prevalent in polyethylene, this invention will find greater utility in the formulation of polyethylene films or films prepared from those E-P copolymers having relatively large amounts of ethylene and possessing a somewhat "polyethylenic" character.

What I claim is:

1. Non-coloring transparent polyolefin film having incorporated as an anti-blocking agent therein white diatomite having a pH of not greater than 7.5, said diatomite being in the form of particles of from 0.5 to 7 microns in size and being present in a concentration in said film in the range of 2 to 4 parts by weight per 1,000 parts by weight of polyolefin, said diatomite being produced by chemically calcining white diatomite of high pH or tan or gray diatomite with a strong inorganic acid.

2. The film of claim 1 wherein said white diatomite has a pH in the range of 5.5 to 7.5.

3. The film of claim 2 wherein said white diatomite has a pH in the range of 6.0 to 7.5.

4. The film of claim 1 wherein said particles are 2 to 6 microns in size.

5. The film of claim 1 wherein said inorganic acid is phosphoric acid.

6. The film of claim 1 wherein said polyolefin is polyethylene.

7. The film of claim 1 wherein said polyolefin is polypropylene.

8. The film of claim 1 wherein said polyolefin is an ethylene propylene copolymer.

9. The film of claim 8 wherein said copolymer contains a relatively larger amount of ethylene monomer and possesses a polyethylenic character.

* * * * *